United States Patent [19]

Willson et al.

[11] Patent Number: 4,950,556
[45] Date of Patent: Aug. 21, 1990

[54] MAGNETO-OPTIC RECORDING MEDIUM

[75] Inventors: Richard F. Willson, Hudson; Vaughn W. Halling, River Falls, both of Wis.

[73] Assignee: Minnesota Mining and Manufacturing Company, St. Paul, Minn.

[21] Appl. No.: 112,735

[22] Filed: Oct. 26, 1987

[51] Int. Cl.$^5$ .......................... G11B 5/66; H01F 1/00
[52] U.S. Cl. .................... 428/694; 428/900; 428/928
[58] Field of Search .......... 428/694, 900, 928

[56] References Cited

U.S. PATENT DOCUMENTS

| | | | |
|---|---|---|---|
| 3,856,579 | 12/1974 | Allen et al. | 148/103 |
| 3,949,387 | 4/1976 | Chaudhari et al. | 340/174 |
| 4,170,689 | 10/1979 | Katsui et al. | 428/457 |
| 4,404,077 | 9/1983 | Fournier | 204/192 |
| 4,414,087 | 11/1983 | Meckel | 204/192 M |
| 4,569,881 | 2/1986 | Freese et al. | 428/213 |
| 4,615,944 | 10/1986 | Gardner | 428/332 |
| 4,684,454 | 8/1987 | Gardner | 204/192.2 |
| 4,693,943 | 9/1987 | Kishi et al. | 428/678 |
| 4,855,175 | 8/1989 | Waka et al. | 428/694 |

FOREIGN PATENT DOCUMENTS

| | | |
|---|---|---|
| 0229292 | 7/1987 | European Pat. Off. |
| 55-107773 | 2/1979 | Japan . |
| 59-139616 | 1/1983 | Japan . |
| 60-985396 | 6/1985 | Japan . |
| 60-231306 | 11/1985 | Japan . |
| 60-231307 | 11/1985 | Japan . |
| 60-233810 | 11/1985 | Japan . |
| 61-84004 | 4/1986 | Japan . |
| 61-087306 | 5/1986 | Japan . |
| 61-113155 | 5/1986 | Japan . |
| 62-047846 | 3/1987 | Japan . |
| 62-089254 | 4/1987 | Japan . |
| 62-112252 | 5/1987 | Japan . |
| 2071696 | 9/1981 | United Kingdom . |

OTHER PUBLICATIONS

Kobayashi, Togami, and Teranishi, "Influence of Oxygen on the Uniformity of RF-Sputtered Amorphous GdCO Films", *Japanese Journal of Applied Physics*, vol. 19, No. 10, Oct. 1980, pp. L581-L584.

Togami and Kobayashi, "Increase in Uniformity of Amorphous GdCo Films by Control of Oxygen Quantity", *Japanese Journal of Applied Physics*, vol. 20, No. 8, Aug. 1981, pp. 1457-1465.

J. Schneider and A. Brunsch, "$O_2$ Contaminated Amorphous FeGd Films", *Journal of Applied Physics*, vol. 49, No. 3, Mar. 1978, pp. 1747-1749.

Tsujimoto H., et al., "Magnetic Properties and Magnetic Kerr Rotation of Amorphous TbFeCo and TbFeCr Films", *J. Magnetism and Magnetic Materials*, (1983) pp. 199-201.

Allen R. et al., "Magneto-Optic Properties of Amorpous Terbium-Iron", *J. Appl. Phys.*, (Mar. 1982) pp. 2353-2355.

Stuart R. V., *Vacuum Technology, Thin Films, and Sputtering*, Academic Press, N.Y., (1983) pp. 108-123.

Imamura, N., et al., "Magneto-Optical Recording on Amorphous Films", *IEEE Transactions on Magnetics*, Sep., 1985, pp. 1607-1612.

Primary Examiner—Marion C. McCamish
Assistant Examiner—Dennis V. Carmen
Attorney, Agent, or Firm—Donald M. Sell; Walter N. Kirn; Peter Forrest

[57] ABSTRACT

A method for producing a magneto-optic layer includes depositing amorphous magnetizable film layer on a substrate using a triode sputtering process. The magneto-optic layer includes an alloy of terbium, cobalt, iron, chromium and an oxygen content approximately between 2-6 atom percent midway through the thickness of the layer.

3 Claims, 2 Drawing Sheets

MAGNETO-OPTIC RECORDING MEDIUM

FIELD OF THE INVENTION

The present invention relates to amorphous thin film magnetic materials, and in particular, it pertains to magnetizable film having a magnetic anisotropy perpendicular to the plane of the film.

BACKGROUND

Magneto-optic recording media are also known by several other names: thermomagnetic media, beam addressable files, and photo-magnetic memories. All of these terms apply to a storage medium or memory element which responds to radiant energy permitting the use of such energy sources as laser beams for both recording and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passed through certain magnetized media. The Kerr effect is the rotation of the plane of polarization of a light beam when it is reflected at the surface of certain magnetized media.

Magneto-optic recording media have several advantages over known magnetic recording media:

1. The spacing between the medium and recording head is greater, thus reducing potential for contact and 2. Using a pulsed laser beam as the writing means, very high density data storage is possible.

3. With a protective layer on top of a magneto-optic layer, the medium is affected less by dust than magnetic media.

In magneto-optic recording, data is written into medium having a preferentially directed magnetization by exposing a localized area (spot or bit) on the recording medium to an electromagnetic or other energy source of sufficient intensity to heat the recording medium above its compensation or Curie point temperature and simultaneously biasing the medium with a magnetic field. Preferably, the energy source is a laser which produces a monochromatic output beam. The magnetic field required to reverse the magnetization of the recording medium varies with the temperature to which the recording medium is brought. Generally speaking for a given material, the higher the temperature, the smaller the required magnetic field coercive force.

The write or record operation for both Curie point and compensation point writing is as follows:

1. The medium is initially in a randomly magnetized state. A domain will herein refer to the smallest stable magnetizable region, although in common usage, a domain is a uniformly magnetized region of any size. A selected area of the medium may be magnetized by exposing said area to a continuous energy beam and a small magnetic bias field normal to the surface of the medium.

2. A small magnetic bias field oriented perpendicular to the surface or plane of the film, but oppositely directed to the magnetic field applied earlier is applied over the entire thin film medium.

3. With the biasing field in place, a light beam from a radiant energy source such as a laser beam is directed toward a selected location or bit on the film where it causes localized heating of the film to a temperature at or above the compensation temperature. When the laser beam is removed, the bit cools in the presence of the biasing magnetic field and has its magnetization switched to that direction. The medium, in effect, has a magnetic switching field which is temperature dependent. The magnetic biasing field applied to the irradiated bit selectively switches the bit magnetization, with the bit momentarily near its compensation temperature under the influence of the laser. The momentary temperature rise reduces the bit coercive force.

In the write operation, the write laser beam (e.g., about 8-12 mW) is focused to the desired diameter (e.g., 1.0 microns) onto the surface of the recording medium by an objective lens.

The memory element or recorded bit is interrogated, or read, nondestructively by passing a low-power (e.g., 1-3 mW) beam of polarized light (e.g., a laser beam) onto the bit storage site for a sufficiently short time so as not to heat the medium to change its magnetic state. The read laser beam is normally shaped to a circular cross-section by a prism, polarized and focused to some small diameter (e.g., 1.0 micron) onto the recording medium by a lens. When the read beam has passed through the recorded spot, it is sent through an optical analyzer, and then a detector such as a photodiode, for detection of any change or lack of change in the polarization.

A change in orientation of polarization of the light is caused by the magneto-optic properties of the material in the bit or site. Thus, the Kerr effect, Faraday effect, or a combination of these two, is used to effect the change in the plane of light polarization. The plane of polarization of the transmitted or reflected light beam is rotated through the characteristic rotation angle $\theta$. For upward bit magnetization, it rotates $+\theta$ degrees and for downward magnetization $-\theta$ degrees. The recorded data, usually in digital form represented by logic values of 1 or 0 depending on the direction of bit magnetization, are detected by reading the change in the intensity of light passing through or reflected from the individual bits, the intensity being responsive to the quantity of light which is rotated and the rotation angle.

Erasure can be accomplished by simply writing new information over old portions of the medium or by simply exposing any given bit to a laser beam of sufficient intensity and then cooling that bit in the presence of a magnetic field in the direction of the initially applied magnetic field. Generally, in the recording process, the external biasing magnetic field is applied by a magnet set above or behind the magneto-optic medium, and in the erasing process, the magnet is reversed in direction.

Forty-five decibels in a 30 kHz band width is generally considered the minimum CNP acceptable for direct read after write (DRAW) media. The speed at which the bits can be interrogated and the reliability with which the data can be read depends upon the magnitude of the magneto-optic properties, such as the angle of rotation, of the thin film and upon the ability of the interrogation system to detect these properties.

The main parameters that characterize a magneto-optic material are the angle of rotation, the coercive force ($H_c$), the Curie temperature and the compensation point temperature. The medium is generally comprised of a single layer or multiple layer system where at least one of the layers is a metal alloy composition. Binary and ternary compositions are particularly suitable for amorphous metal alloy formation. Suitable examples would be rare earth-transition metal (RE-TM) compositions, such as: Gadolinium-cobalt (Gd-Co), Gadolinium-iron (Gd-Fe), Terbium-iron (Tb-Fe), Dysprosium-iron (Dy-Fe), Gd-Tb-Fe, Tb-Dy-Fe, Tb-Fe-Co, Terbium-iron-chromium (Tb-Fe-Cr), Gd-Fe-Bi (Bismuth), Gd-Fe-Sn (Tin), Gd-Fe-Co, Gd-Co-Bi, Gd-Dy-Fe and Tb-Fe-Co-Cr.

Japanese Patent Application No. 59/206864 discloses an optical magnetic recording medium consisting of an amorphous alloy and film. The film has an axis of easy magnetization in the vertical direction against the film face. The optical magnetic recording medium consists of a binary composition which in the medium is described as having a composition of $Tb_{0.25}$ $(Fe_{0.85} Co_{0.15})_{0.71}$ $Cr_{0.04}$ with a film thickness of 1000 Å. The film is deposited using a sputtering process with a sputtering gas pressure of 3-8 Pa.

Japanese Patent Application No. 59/88076 describes the terbium-iron-cobalt-M alloy composition for use in a magnetizable amorphous thin film layer (where M is at least one metal selected from tin, bismuth, nickel, chromium and copper). The alloy composition is: $(Tb_x(Fe_{1-y}Co_y)_{1-x})_{1-z}M_z$ (x is from 0.1 to 0.4. v is from 0.01 to 0.5. z is from 0.002 to 0.1). The amorphous magneto-optic layer is formed to 0.01-1 micron thick on an appropriate substrate such as glass by vacuum deposition or sputtering.

Magneto-optic amorphous thin films having a terbium-iron-cobalt composition can be typically deposited by a triode sputtering process. Such sputtering process conditions are an initial vacuum of $4.4 \times 10^{-7}$ mBar and a background operating pressure resulting from the sputtering gas (argon) of $1.2 \times 10^{-3}$ mBar. Initial high vacuums were needed to minimize contaminants. Relatively low sputtering argon pressure was needed to increase the mean free path from the sputtering target to the deposition substrate such that contaminant interactions were minimized. Such a deposition process is disclosed in the Freese et al U.S. Pat. No. 4,569,881, which is incorporated herein by reference.

To achieve such deposition background pressures, the vacuum chamber needs to be pumped for at least four hours and is typically pumped overnight, resulting in pumping times of 16 hours or greater. Such evacuation times result in high energy costs and manufacturing inefficiencies.

SUMMARY OF THE INVENTION

Figure 1:
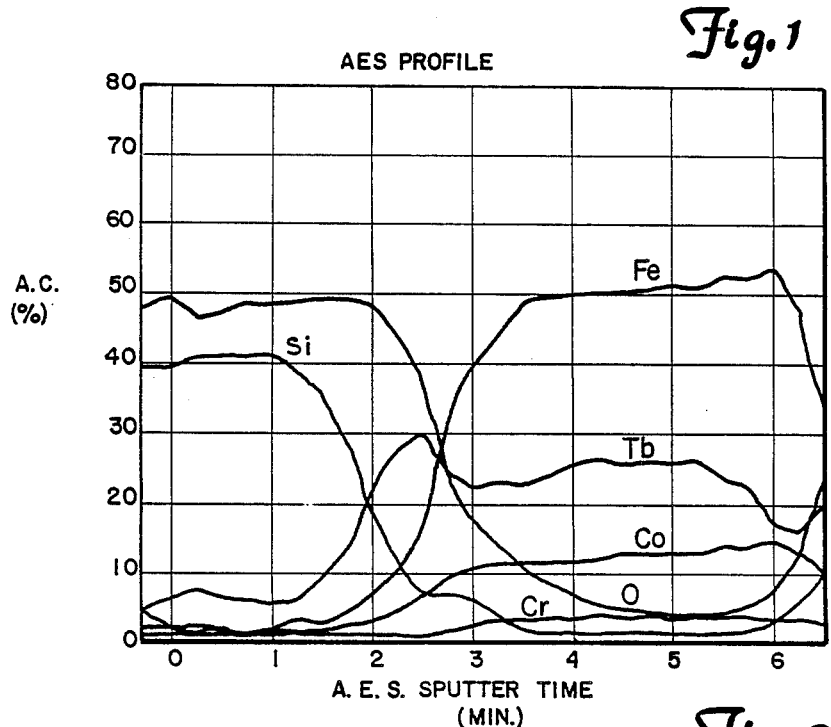
FIG. 1 is a graphical view of a depth composition profile by a Auger Electron Spectroscopy of the alloy layer of Example 1.

The present invention includes a magneto-optical recording medium comprising a substrate and a magnetizable film on the substrate, the magnetizable film having a magnetic anisotropy perpendicular to the film. The film includes an alloy of terbium, cobalt, iron and chromium, characterized by an oxygen content between approximately 2-6 atom percent midway through the thickness of the film. Preferably, the chromium concentration in the film is in the approximate range of 3-6 atom percent. In addition, the preferred terbium concentration is 27-30 atom percent, the preferred cobalt concentration is 13-15 atom percent, and the preferred iron concentration is 51-54 atom percent.

The present invention also includes a method of depositing a magneto-optic layer on a substrate wherein the magneto-optic layer includes terbium, cobalt, iron and chromium as a thin alloy film using a triode sputtering process under a background pressure such that the film forms an oxide corresponding to an oxygen content between approximately 2-6 atom percent midway through the thickness of the film. Initially, the chamber is preferably evacuated to an initial deposition pressure of $5.0 \times 10^{-6}$ mBar or greater pressure. Minimal presputtering, such as for 30-45 seconds, is used to prepare for the deposition step. Preferably, the thin film alloy is deposited at a deposition pressure of $1.2 \times 10^{-3}$ mBar or greater and up to at least a deposition pressure of $1.0 \times 10^{-2}$ mBar.

The present invention permits the deposition of a magneto-optic layer at higher background pressures in a triode sputtering process. The magneto-optic layer that is produced is characterized by satisfactory performance properties, with some properties being enhanced.

DETAILED DESCRIPTION OF THE INVENTION

Magnetizable metal alloys for use as magneto-optic recording medium are deposited as thin films by a sputtering process. The deposition of such alloys using a sputtering process was thought to have required very low background pressures. For example, using a triode sputtering process, the vacuum chamber was evacuated to an initial background pressure of at least $4.0 \times 10^{-7}$ mBar and then to a deposition pressure (upon introduction of the sputtering gas) of approximately $1.3 \times 10^{-3}$ mBar. To reach such an initial background pressure, the vacuum chamber had to be pumped typically for at least four hours, and was generally left to pump overnight (16 or more hours) so that the vacuum system would reach the low background pressure.

The purpose for such an initial low background pressure was to ensure that the vacuum chamber was evacuated of contaminants. The primary contaminant at such low pressures is water. The thin films have alloy compositions that contain rare earth metals which are highly oxidative reacting readily with water. For example, in U.S. Pat. No. 4,569,881, oxygen is considered an impurity and the oxidation of rare earth metals is considered deleterious to the recording characteristics of the thin film. Shortening the pump time (thus resulting in a higher initial background pressure) prior to deposition resulted in thin films having poor record characteristics. Generally, a wrinkling of the vacuum deposited layers of the thin film occurred.

Another method of preparing the vacuum chamber includes presputtering for a lengthy time period, such as 60 minutes. The oxygen within the vacuum chamber is scavenged by the alloy which is deposited on the chamber walls. The vacuum chamber includes a shutter disposed between the sputtering target and deposition substrate. During presputtering the shutter is in a closed position avoiding deposition of the alloy on the substrate.

The process of the present invention permits usage of higher pressures in a triode sputtering process for depositing a metal alloy to produce a thin film for use as a magneto-optic medium. In particular, the process of the present invention permits the deposition of a thin film having a terbium-cobalt-iron-chromium alloy in an environment such that an oxide is formed. The oxide is not detrimental to the record properties of the film. It has been found that such oxide when formed by the present process enhances the magneto-optic properties of the thin film.

The thin film composition of the present invention includes a terbium content of 26–30 atom percent, a cobalt content of 13–15 atom percent, an iron content of 51–54 atom percent, and a chromium content of 3–6 atom percent. Auger Electron Spectroscopy (AES) shows that the thin film composition of the present invention includes an oxygen concentration between 2–6 atom percent proximate the center of the film. It is believed that the moisture in the vacuum chamber due to the higher background pressure is the source of the oxygen found near the center of the thin film. The oxygen-containing film has very acceptable record characteristics and some characteristics are enhanced over previous terbium-cobalt-iron films.

For example, the recording threshold of the film appears less dependent upon linear velocity during recording. By recording threshold is meant the laser power needed to magnetically orient an area ("bit") in the film. Constant angular velocity of a disc produces a changing linear velocity, the linear velocity increasing with the disc radius. Constant angular velocity is preferred in recording and reading of discs and a film that is less dependent upon linear velocity for recording is greatly preferred.

In addition, the present invention permits a wider latitude in operating conditions in the sputtering process. Since a higher oxygen content than previously known within the film is acceptable, a minimum amount of presputtering is needed. Typically, only 30–45 seconds of presputtering is needed, which is sufficient to remove an initial layer from the target metal. A wider latitude in operating background pressure during deposition of the terbium-cobalt-iron film layer is also available. Previously, it was believed that at least a $1.3 \times 10^{-3}$ mBar vacuum was needed. Using the present process, depositions at operating background pressures as high as $1.0 \times 10^{-2}$ mBar produced films having acceptable recording properties.

The magneto-optic film of the present invention is deposited on a substrate, such as a disc made from polymethylmethacrylate (PMMA), polycarbonate or polyester. Other substrates, such as are listed in U.S. Pat. No. 4,569,881, are also within the scope of the present invention. Typically, an SiOx layer, where x is 1 or 2, is initially deposited on a substrate. Next, the magneto-optic alloy film layer is deposited by triode sputtering as a second layer. A third layer of SiOx is then deposited on the second layer of the magneto-optic alloy film. A reflective surface is then deposited on the third layer. For example, chromium oxide may be deposited as the fourth layer and copper deposited as the fifth layer on the fourth chromium oxide layer and a sixth layer of chromium oxide then deposited on the copper.

The first three layers are deposited in a vacuum chamber having a triode sputtering apparatus and a baffled resistance heated sublimation source. The chromium oxide layers are deposited by magnetron sputtering and the copper layer is deposited by vacuum resistance evaporation.

This invention will be further clarified by considering the examples which follow in this description. The examples are intended to be purely exemplary.

EXAMPLE 1

Two plastic discs (having 1.6 micron pitch grooves on one side) were mounted on a rotation fixture in a vacuum system such that the grooved surface of the plastic discs would be coated. Two glass slides were also mounted on the rotation fixture.

The vacuum system was equipped with two deposition sources; a baffled resistance heated sublimation source with SiO as source material and a triode sputtering device having a target of iron, terbium, cobalt and chromium. During the loading process the deposition chamber and sources were exposed to ambient laboratory atmosphere conditions.

Each source was equipped with an externally actuated shutter positioned between the source and rotation fixture such that when the shutter was opened depositing material coated the rotating samples. With the shutter closed the depositing material was intercepted thereby coating the shutter surface.

The vacuum system is continuously pumped while the depositions are made.

The vacuum system was sealed and pumping initiated. At 43 minutes pump time, the pressure was $5.2 \times 10^{-6}$ mBar. A quadrapole mass spectrometer was used for residual gas analysis (RGA).

| Mass Number | Species | RGA Current ($\times 10^{-10}$ amps) |
| --- | --- | --- |
| 1 | H | 28 |
| 2 | $H_2$ | 2 |
| 17 | *OH | 13 |
| 18 | *$H_2O$ | 45 |
| 28 | $N_2$ | 3 |
| 32 | *$O_2$ | 1 |

At 44 minutes pump time, the SiOx source was resistance heated for 3 minutes with its shutter closed to drive off adsorbed gasses. This results in a momentary pressure rise during which the desorbed gasses are removed by the vacuum pump.

At 50 minutes pump time, the first layer of SiOx was coated on the rotating samples to a thickness of approximately 400 angstroms. Coating rate was approximately 4 angstroms per second.

At 56 minutes pump time, the system pressure was a $5.3 \times 10^{-6}$ mBar. The residual gas analysis shows the oxygen containing species (*) close to the same level as was present prior to the deposition of the SiOx.

| Mass Number | Species | RGA Current ($\times 10^{-10}$ amps) |
| --- | --- | --- |
| 1 | H | 30 |
| 2 | $H_2$ | 6 |
| 17 | *OH | 10 |
| 18 | *$H_2O$ | 48 |
| 28 | $N_2$ | 3 |
| 32 | *$O_2$ | 1 |

At 57 minutes pump time, argon gas was inletted at 30 sccm resulting in the system pressure stabilizing at $1.2 \times 10^{-3}$ mBar. At 58 minutes, the triode was activated and a predeposition was done coating against the closed shutter for 30 seconds. The shutter was opened and the Co-Tb-Fe-Cr material was coated on the rotating samples at a rate of 3 to 4 angstroms per second to a thickness of approximately 320 angstroms in 90 seconds. The triode shutter was closed, the device turned off, and the argon turned off.

At 63 minutes pump time, the system pressure was $3.0 \times 10^{-6}$ mBar. The residual gas analysis showed a significant decrease in species containing oxygen (*).

| Mass Number | Species | RGA Current ($\times 10^{-10}$ amps) |
|---|---|---|
| 1 | H | 16 |
| 2 | $H_2$ | 12 |
| 17 | *OH | 14 |
| 18 | *$H_2O$ | 20 |
| 28 | $N_2$ | 3 |
| 32 | *$O_2$ | 0.1 |

At 65 minutes pump time, the pressure was $3.3 \times 10^{-6}$ mBar and the third layer of SiOx was deposited to a thickness of approximately 290 angstroms at a rate of 3.5 angstroms per second.

The two discs and one glass slide were mounted on a rotation fixture in another vacuum system equipped with two shuttered deposition sources. A tubular magnetron source having a chromium target was used to reactively sputter deposit CrOx. A resistance heated source was used to evaporate copper.

The vacuum system was continuously pumped while the depositions are made.

The system was evacuated to $1.4 \times 10^{-6}$ Torr ($1.8 \times 10^{-6}$ mBar) and oxygen was inletted at a rate of 0.3 sccm, stabilizing the pressure at $2.5 \times 10^{-5}$ Torr ($3.3 \times 10^{-5}$ mBar). Argon was inletted at 56 sccm bringing the system pressure to $3.3 \times 10^{-3}$ Torr ($4.3 \times 10^{-3}$ mBar). The magnetron was turned on and the shutter opened for three seconds during which a fourth film of CrOx less than 50 angstroms thick was deposited on the rotating samples.

The magnetron source was turned off. The argon and oxygen gas were turned off and the vacuum stabilized at $1.4 \times 10^{-6}$ Torr ($1.8 \times 10^{-6}$ mBar)

The copper evaporation source was activated and deposition rate of 40 angstroms per second stabilized before opening the shutter and coating a fifth film of copper approximately 1200 angstroms thick.

A sixth layer of CrOx was deposited in the same manner as the fourth layer.

Analysis of the deposited alloy by Inductively Coupled Plasma (ICP) showed the metallic content to be 28.1 atom percent terbium, 14.0 atom percent cobalt, 53.9 atom percent iron and 4.0 atom percent chromium.

Auger Electron Spectroscopy (AES) indicated approximately 4 atom percent oxygen (FIG. 1), approximately midway through the thickness of the alloy layer. The AES analysis was obtained using a Perkin-Elmer Model 595 Scanning Auger Microprobe using a combination of auger surface analysis and argon-ion sputter etching. The profiles plotted in FIG. 1 were obtained by adjusting the sensitivity factors for the metallic elements so that the concentrations in the films agree with the values obtained by ICP analysis. Auger oxygen sensitivity relative to iron was used to determine the oxygen concentrations.

Since the oxygen levels in the magneto-optic films were low, special precautions were taken during the analysis to minimize oxygen re-adsorbtion on the surface being measured. The argon sputtering gas was exposed to a getter within the ion gun, while the vacuum chamber itself had a freshly-evaporated reactive film (titanium) on a liquid nitrogen-cooled surface for high rate pumping of oxygen and water vapor. The ion beam raster was reduced to one-fourth of its normal size during the magneto-optic portion of the depth profile so that the ion beam would not skirt the outer SiOx layer at the edges of the crater created by the sputtering.

The plastic discs were dynamically tested using an optical disc recorder (ODR). The ODR was equipped with a laser diode emitting at approximately 820 nanometers wavelength. The ODR focused and directed the laser beam through the thickness of the plastic disc, onto the alloy layer on one groove of the rotating disc. An electromagnet located behind the disc applied a field over an area larger than that addressed by the focused laser beam. The discs were rotated at 3240 rpm.

Erasure (pre-alignment of the randomingly aligned vertical magnetic domains in the Co-Tb-Fe-Cr+O layer) of one groove was accomplished by simultaneously applying magnetic field of 800 Oe and directing the laser beam energy of 12 mW onto the groove during one rotation of the disc.

Recording was done by simultaneously applying a reversed magnetic field of 200 Oe and pulsing the laser beam at 4 megahertz between zero mW output and the record power selected, directing the laser beam onto the same groove during one rotation of the disc.

Reading of the recorded groove area was done without magnetic field by directing the laser beam energy of 2 mW energy onto the groove and detecting the changes of polarization in the reflected beam.

Figure 2:
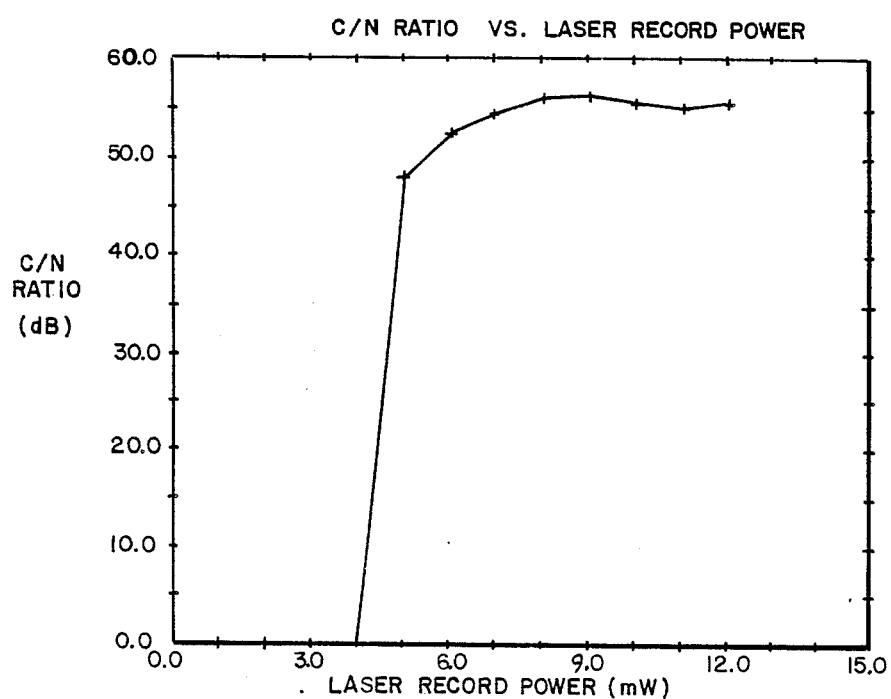
FIG. 2 is a graphical view of the carrier-to-noise ratio as a function of record laser power of the alloy layer of Example 1.

Using the same groove on the disc, erase, record and read cycles were repeated; varying record power. FIG. 2 illustrates carrier-to-noise (C/N) ratio detected during reading as a function of record laser power for one of the discs of this example. This C/N ratio of the media is very acceptable since the C/N ratio is higher than 50 dB for record powers of 6 to 12 mW.

EXAMPLE 2

Using the same apparatus as described in Example 1, two plastic discs and two glass slides were placed in the vacuum chamber for coating.

The vacuum chamber was pumped prior to deposition for 17 hours and 10 minutes and achieved an initial background pressure of $4.0 \times 10^{-7}$ mBar. RGA showed lower readings for oxygen containing species during the coating processes than in Example 1. The deposition operating pressure for the magneto-optic alloy was $1.2 \times 10^{-3}$ mBar.

A first SiOx layer approximately 400 angstroms thick was deposited on two glass slides and two plastic discs. A second layer of terbium, cobalt, iron and chromium was deposited by triode sputtering. ICP analysis showed that this layer's metallic composition was 27.8 atom percent terbium, 13.9 atom percent cobalt,, 54.3 atom percent iron and 4.0 atom percent chromium. The thickness of the second layer as measured by crystal end point monitoring was approximately 320 angstroms. A third layer of SiOx approximately 290 angstroms thick was deposited on top of the second layer.

Figure 3:
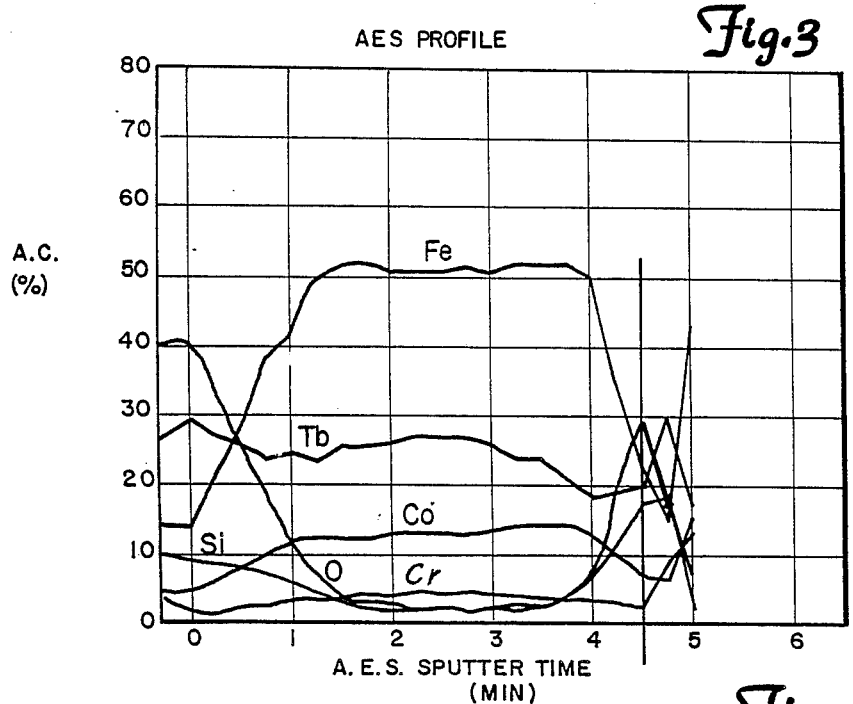
FIG. 3 is a graphical view of a depth composition profile by a Auger Electron Spectroscopy of the alloy layer of Example 2.

AES depth profile analysis showed that the center of the alloy layer contained approximately 2.0 atom percent of oxygen (see FIG. 3).

A reflective surface having chromium oxide/copper/chromium oxide was added to the two plastic substrates and one glass slide in the manner described in Example 1.

The plastic discs were dynamically tested using an ODR as in Example 1.

Figure 4:
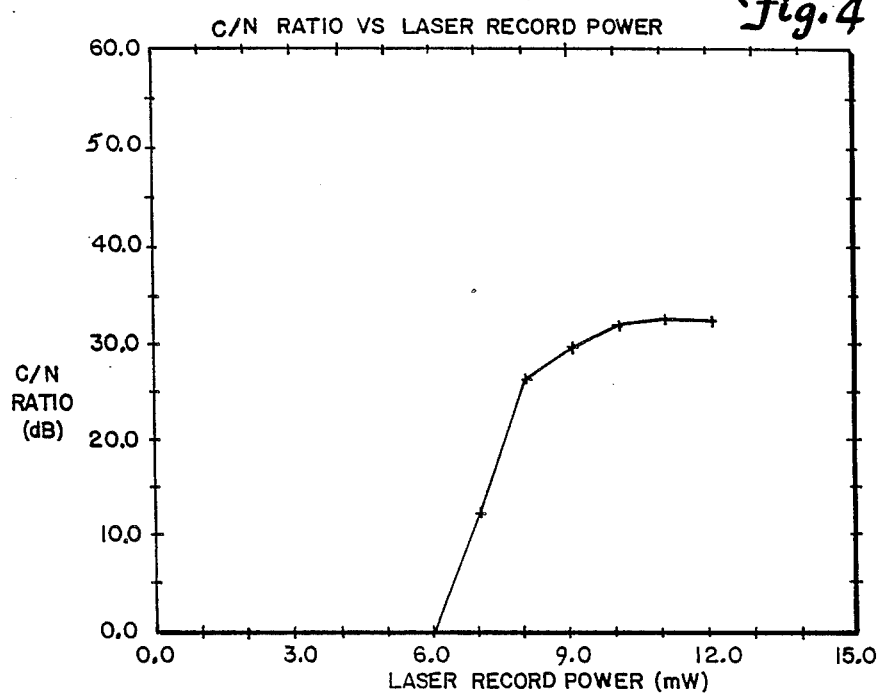
FIG. 4 is a graphical view of the carrier-to-noise ratio as a function of record laser power of the alloy layer of Example 2.

FIG. 4 illustrates the C/N ratio detected during reading as a function of record laser power for one of the discs of this example. The poor quality of the media is demonstrated by the C/N ratio being lower than 40 dB for record powers of 7 to 12 mW.

EXAMPLE 3

The magneto-optic layer composition of the present invention was evaluated against a magneto-optic layer composition of terbium, cobalt and iron.

First, using apparatus as described in Example 1, 3 plastic substrate discs were placed in the vacuum chamber. The vacuum chamber was evacuated for 16 hours and 45 minutes until an initial background pressure of $1.6 \times 10^{-7}$ mBar was achieved. A first layer of SiOx of approximately 300 angstroms thick was deposited from the resistance heated baffled source. A second layer containing magneto-optic material was deposited at an operating argon sputtering pressure of $1.7 \times 10^{-7}$ mBar. The second layer contained no chromium and the composition by ICP analysis was 23.0 atom percent terbium, 5.3 atom percent cobalt, and 71.7 atom percent iron. The layer was approximately 175 angstroms thick by crystal end point monitoring. A third layer of SiOx approximately 300 angstroms thick was also deposited in a similar manner as the first layer. A reflective surface was then added by magnetron sputtering of an aluminum/chromium alloy that was approximately 1000 angstroms thick as measured by crystal end point monitoring.

Second, using the same apparatus as described in Example 1, a terbium, cobalt, iron and chromium magneto-optic layer was deposited using higher background pressures. The vacuum chamber was pumped for 1 hour and 10 minutes until an initial background pressure of $3.3 \times 10^{-6}$ mBar was achieved. An initial layer of SiOx approximately 400 angstroms thick was deposited from the resistance heated baffled source. A second layer of magneto-optic alloy was deposited by triode sputtering with an operating argon sputtering pressure of $1.2 \times 10^{-3}$ mBar. The triode was activated and a predeposit was done coating against the shutter for 45 seconds. The shutter was opened and the alloy was deposited for 90 seconds which resulted in a magneto-optic layer having a thickness of approximately 270 angstroms by crystal end point monitoring. A third layer of SiOx approximately 290 angstroms thick was deposited in the same manner as the first layer.

The disc was removed from the vacuum system and a reflective surface added to the third layer. Initially, a chromium oxide layer less than 50 angstroms thick was deposited by magnetron sputtering. A fifth layer of copper of approximately 1200 angstroms thick was evaporated from a resistance heated source and a sixth layer of chromium oxide less than 50 angstroms thick was added onto the copper layer.

Set forth below is a table comparing the disc having the magneto-optic layer without chromium (designated as A) and the disc containing the magneto-optic layer with chromium (designated as B). The table shows that the magneto-optic layer containing chromium and deposited at the higher background pressures exhibits a record threshhold power that is less dependent upon the linear velocity of the disc than the terbium-cobalt-iron layer. As previously discussed, it is desirable to rotate optical discs at constant angular velocity, and since linear velocity increases with disc radius when the angular velocity is constant, less dependence of record power on linear velocity is a desired characteristic.

TABLE

| Disk | RPM | Threshhold Record Power (mW) | Bit Size (UM) | Disc Radius (MM) |
| --- | --- | --- | --- | --- |
| A | 1800 | 4.5 | 1.3 | 55 |
| A | 3240 | 6.4 | 2.3 | 55 |
| B | 1800 | 5.2 | 1.3 | 55 |
| B | 3240 | 5.2 | 2.3 | 55 |

A - magneto-optic layer without chromium
B - magneto-optic layer with chromium

EXAMPLE 4

The apparatus of Example 1 was used to deposit a magneto-optic layer on 4 glass slides and 2 plastic discs.

The vacuum system was pumped for 1 hour and 7 minutes reaching a pressure of $3.5 \times 10^{-6}$ mBar before beginning the coating process. RGA showed similar readings for oxygen containing species during the coating process as in Example 1.

A first layer of SiOx approximately 400 angstroms thick was deposited from the resistance heated baffled source. A second magneto-optic layer was deposited by triode sputtering with an argon sputtering pressure of $1 \times 10^{-2}$ mBar by inletting argon at 66 sccm during the operation of the triode. An ICP analysis of the metallic composition of the magneto-optic layer was 29.8 atom percent terbium, 14.1 atom percent cobalt, 51.6 atom percent iron and 4.5 atom percent chromium.

A third layer of SiOx approximately 290 angstroms thick was deposited on the second layer. A fourth layer of CrOx less than 50 angstroms thick was deposited by magnetron sputtering. A fifth layer of copper evaporated from a resistance heated source was deposited on the fourth layer, approximately 1200 angstroms thick. A sixth layer of CrOx less than 50 angstroms thick was deposited on the copper layer.

A plastic disc was dynamically tested using an ODR as in Example 1. The acceptability of the media was illustrated by the C/N ratio being higher than 50 dB for record powers of 7 to 12 mW.

Threshhold record power measurements performed at the inner and outer positions on the disc showed only a small change in record power indicating that only a small increase in record power is needed as linear velocity of the disc increases with increasing radii.

TABLE

| Disk Radius (MM) | RPM | Threshhold Record Power (mW) | Bit Size (UM) |
| --- | --- | --- | --- |
| 30 | 3240 | 5.6 | 1.3 |
| 55 | 3240 | 5.8 | 2.3 |

In addition, a higher argon operating sputtering pressure was used to deposit the magneto-optic layer in Example 1, both examples producing a satisfactory product, indicating that more latitude in sputtering pressure is allowed by the inventive process.

EXAMPLE 5

The following example included the deposition of a terbium, cobalt and iron magneto-optic layer without chromium deposited at higher initial and background pressures. The apparatus of Example 1 was used to deposit a magneto-optic layer on 4 glass slides and 2 plastic discs. Evacuation time of the vacuum chamber was 1 hour and 47 minutes reaching a pressure of $3.5 \times 10^{-6}$ mBar before beginning the coating process. RGA indicated levels of oxygen containing species during the coating process were similar to those in Example 1.

A first layer of SiOx approximately 400 angstroms thick was deposited from the resistance heated baffled source onto the 4 glass slides and two plastic discs. A second magneto-optic layer was deposited by triode sputtering with an argon sputtering pressure of $1.0 \times 10^{-2}$ mBar by inletting argon at 66 sccm during the operation of the triode. An ICP analysis of the layer revealed a metallic composition of 30.7 atom percent terbium, 13.4 atom percent cobalt and 55.9 atom percent iron and 0 atom percent chromium. The layer was approximately 375 angstroms as measured by crystal end point monitoring. A third layer of SiOx approximately 290 angstroms thick was deposited on the second layer.

A reflective surface was then applied to the third layer. A fourth layer of chromium oxide less than 50 angstroms thick was deposited on the third layer by magnetron sputtering. Next, a copper layer of about 1200 angstroms thick was evaporated from a resistance heated source. A sixth layer of chromium oxide less than 50 angstroms thick was then deposited on the copper layer.

ODR testing of the plastic disc revealed that more than 8 mW laser energy was required to initiate recording at both inner and outer radii. Such a high record level has limited utility. For record powers of 8 to 11 mW the C/N ratio was not above 50 dB, limiting the utility of the disc.

Although the present invention has been described with reference to preferred embodiments, workers skilled in the art will recognize that changes may be made in form and detail without departing from the spirit and scope of the invention.

What is claimed is:

1. A magneto-optic recording medium comprising a substrate and a magnetooptic film on the substrate, the magnetooptic film having a magnetic anisotropy perpendicular to the film, the film including an alloy of terbium, cobalt, iron and chromium characterized by an oxygen content approximately between 2-6 atom percent midway through the thickness of the film.

2. The medium of claim 1 wherein the chromium concentration in the film is in the approximate range of 3-6 atom percent.

3. The medium of claim 1 wherein the terbium concentration is 27-30 atom percent, the cobalt concentration is 13-15 atom percent and the iron concentration is 51-54 atom percent.

* * * * *

UNITED STATES PATENT AND TRADEMARK OFFICE
CERTIFICATE OF CORRECTION

PATENT NO. : 4,950,556

DATED : August 21, 1990

INVENTOR(S) : Richard F. Willson et al.

It is certified that error appears in the above-identified patent and that said Letters Patent is hereby corrected as shown below:

Col. 2, line 54, "CNP" should read --CNR--.

Claim 1, col. 12, line 21, "content approximately between" should read --content between--.

Claim 1, col. 12, lines 21-22, "percent midway" should read --percent approximately midway--.

Signed and Sealed this

Ninth Day of June, 1992

*Attest:*

DOUGLAS B. COMER

*Attesting Officer*     *Acting Commissioner of Patents and Trademarks*